(12) United States Patent
    Bick

(10) Patent No.: US 12,694,890 B2
(45) Date of Patent: Jul. 28, 2026

---

(54) AUDIO-BASED INSECT MONITORING

(71) Applicant: Wisconsin Alumni Research Foundation, Madison, WI (US)

(72) Inventor: Emily Bick, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 98 days.

(21) Appl. No.: 18/652,903

(22) Filed: May 2, 2024

(65) Prior Publication Data

US 2024/0371395 A1    Nov. 7, 2024

Related U.S. Application Data

(60) Provisional application No. 63/463,350, filed on May 2, 2023.

(51) Int. Cl.
    *G10L 25/51* (2013.01)
    *A01M 1/00* (2006.01)
    *G10L 25/30* (2013.01)

(52) U.S. Cl.
    CPC .............. *G10L 25/51* (2013.01); *A01M 1/00* (2013.01); *G10L 25/30* (2013.01)

(58) Field of Classification Search
    CPC ......... G10L 25/51; G10L 25/30; G06Q 50/02; G01V 1/001; G06N 20/00; G06N 5/04; A01M 1/00; A01M 1/026; A01M 2200/011; H04R 19/04
    See application file for complete search history.

(56) References Cited

U.S. PATENT DOCUMENTS

| | | | |
|---|---|---|---|
| 11,564,384 B2 | 1/2023 | Bender et al. | |
| 11,612,145 B1 * | 3/2023 | Davidi | G06N 20/20 |
| | | | 449/6 |
| 2007/0143088 A1 * | 6/2007 | Garland | G16H 50/80 |
| | | | 703/11 |
| 2017/0273290 A1 * | 9/2017 | Jay | A01M 1/026 |
| 2017/0367317 A1 * | 12/2017 | Groeneveld | G06T 7/0016 |

(Continued)

FOREIGN PATENT DOCUMENTS

| | | | | |
|---|---|---|---|---|
| AU | 2021106981 A4 * | 12/2021 | | G01N 33/245 |
| KR | 101775146 B1 | 9/2017 | | |

OTHER PUBLICATIONS

Bick et al., "Detection of insect health with deep learning on near-infrared sensor data", bioRxiv (2021), 17 pages.

(Continued)

*Primary Examiner* — Adnan Aziz

(74) *Attorney, Agent, or Firm* — CANTOR COLBURN LLP

(57) ABSTRACT

Described herein are systems and methods for audio-based insect activity monitoring and prediction. According to an aspect, a method includes receiving, by an insect activity prediction system, audio data associated with at least one microphone in contact with a surface of a plant. The insect activity prediction system inputs the audio data into an insect activity model to generate an insect activity prediction. The insect activity prediction system uses the insect activity model to generate an insect activity prediction of a presence of insects and at least one species of the insects based at least in part on the audio data. The insect activity prediction can be output to a user interface.

20 Claims, 5 Drawing Sheets

(56) References Cited

U.S. PATENT DOCUMENTS

| | | | | |
|---|---|---|---|---|
| 2019/0380325 A1* | 12/2019 | Bender | ........................ | G06N 5/04 |
| 2021/0325346 A1* | 10/2021 | Khait | ........................ | G01N 29/42 |
| 2021/0342713 A1* | 11/2021 | D'Elia | ........................ | A01M 1/026 |
| 2022/0142135 A1* | 5/2022 | Acharya | ........................ | H04N 7/188 |
| 2023/0329212 A1* | 10/2023 | Bassam Sinokrot | ........................ | |
| | | | | G06N 3/0442 |

OTHER PUBLICATIONS

Bick et al., "Dynamics of pollen beetle immigration and colonisation of oilseed rape (*Brassica napus*) in Europe", Pest Management Science (2023), 8 pages.

Hussein et al., "Detection of the red palm weevil rhynchophorus ferrugineus using its bioacoustics features", Bioacoustics 19.3 (2010): 177-194, 20 pages.

Rydhmer et al. "Automating insect monitoring using unsupervised near-infrared sensors", Scientific Reports (2022), 11 pages.

Rydhmer et al., "Automating insect monitoring using unsupervised near-infrared sensors", arXiv preprint arXiv:2108.05435, (2021), 16 pages.

International Search Report and Written Opinion Issued in International Application No. PCT/US2024/027344 mailed Aug. 22, 2024, 70 Pages.

Mankin et al., "Eavesdropping on Insects Hidden in Soil and Interior Structures of Plants", Journal of Economic Entomology, vol. 93, No. 4, Aug. 2000, pp. 1173-1182.

Yazgac et al., "Detection of Sunn Pests Using Sound Signal Processing Methods", 2016 Fifth International Conference on Agro-Geoinformatics, IEEE, Jul. 2016, 6 Pages.

Zhang et al., "A Novel Insect Sound Recognition Algorithm Based on MFCC and CNN", 2021 6th International Conference on Communication, Image and Signal Processing, IEEE, 2021, pp. 289-294.

* cited by examiner

FIG. 1

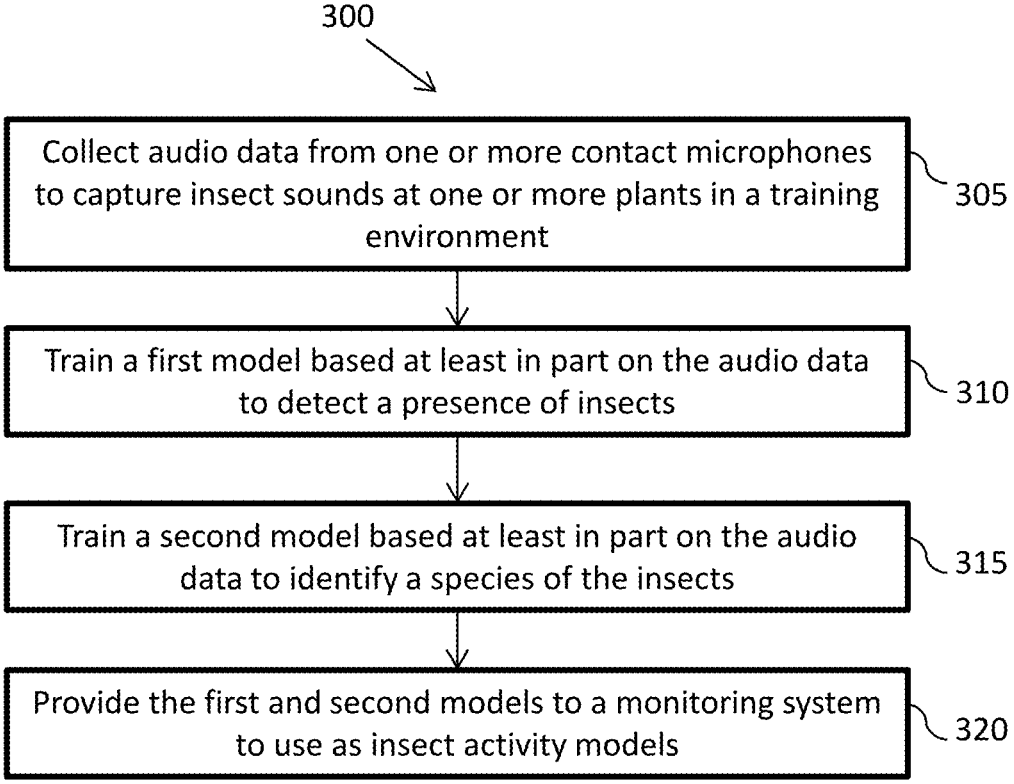

300

| Collect audio data from one or more contact microphones to capture insect sounds at one or more plants in a training environment | 305 |

| Train a first model based at least in part on the audio data to detect a presence of insects | 310 |

| Train a second model based at least in part on the audio data to identify a species of the insects | 315 |

| Provide the first and second models to a monitoring system to use as insect activity models | 320 |

FIG. 3

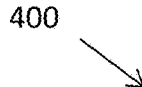

400

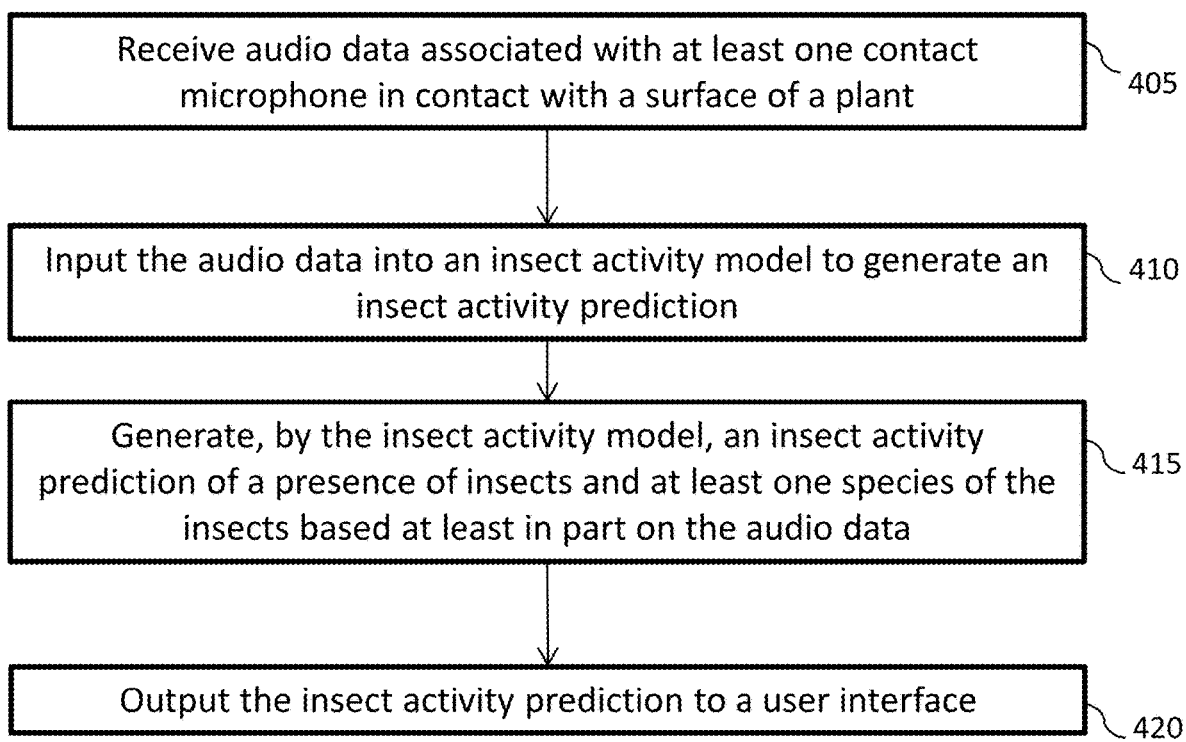

Receive audio data associated with at least one contact microphone in contact with a surface of a plant — 405

Input the audio data into an insect activity model to generate an insect activity prediction — 410

Generate, by the insect activity model, an insect activity prediction of a presence of insects and at least one species of the insects based at least in part on the audio data — 415

Output the insect activity prediction to a user interface — 420

FIG. 4

AUDIO-BASED INSECT MONITORING

CROSS REFERENCE TO RELATED APPLICATIONS

This application claims the benefit of priority to U.S. Provisional Application No. 63/463,350 filed May 2, 2023, the disclosure of which is incorporated herein by reference in its entirety.

FIELD OF THE DISCLOSURE

The present disclosure is related to insect monitoring, particularly audio-based insect activity monitoring.

BACKGROUND

Herbivorous insects are major pests of crops, causing significant damage to crop yield. The detection and monitoring of insect activity can be helpful for effective pest management, but conventional methods can be time-consuming, inefficient, and destructive. Larval boring insects are difficult to detect without destroying the crop, as they are located within the plant. Larvae are often a damaging life stage. Similarly, root-feeding insects are also difficult to detect without potentially damaging plant root systems.

BRIEF SUMMARY

In an aspect, a method includes receiving, by an insect activity prediction system, audio data associated with at least one microphone in contact with a surface of a plant. The insect activity prediction system inputs the audio data into an insect activity model to generate an insect activity prediction. The insect activity prediction system uses the insect activity model to generate an insect activity prediction of a presence of insects and at least one species of the insects based at least in part on the audio data. The insect activity prediction can be output to a user interface.

According to an aspect, a system includes a memory system having a plurality of computer readable instructions and one or more processors configured to execute the computer readable instructions to perform a plurality of operations. The operations include receiving audio data associated with at least one microphone in contact with a surface of a plant and inputting the audio data into an insect activity model to generate an insect activity prediction. The operations also include generating an insect activity prediction of a of insects and at least one species of the insects based at least in part on the audio data. The operations further include outputting the insect activity prediction to a user interface.

According to a further aspect, a computer program product includes a computer readable storage medium embodied with computer program instructions that when executed by one or more processors cause the one or more processors to perform a plurality of operations including receiving audio data associated with at least one microphone in contact with a surface of a plant and inputting the audio data into an insect activity model to generate an insect activity prediction. The operations also include generating an insect activity prediction of a presence of insects and at least one species of the insects based at least in part on the audio data. The operations further include outputting the insect activity prediction to a user interface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts an insect activity prediction system in accordance with one or more embodiments;

FIG. 3 depicts a training process in accordance with one or more embodiments;

FIG. 4 depicts an audio-based insect activity monitoring process in accordance with one or more embodiments;

Figure 2:
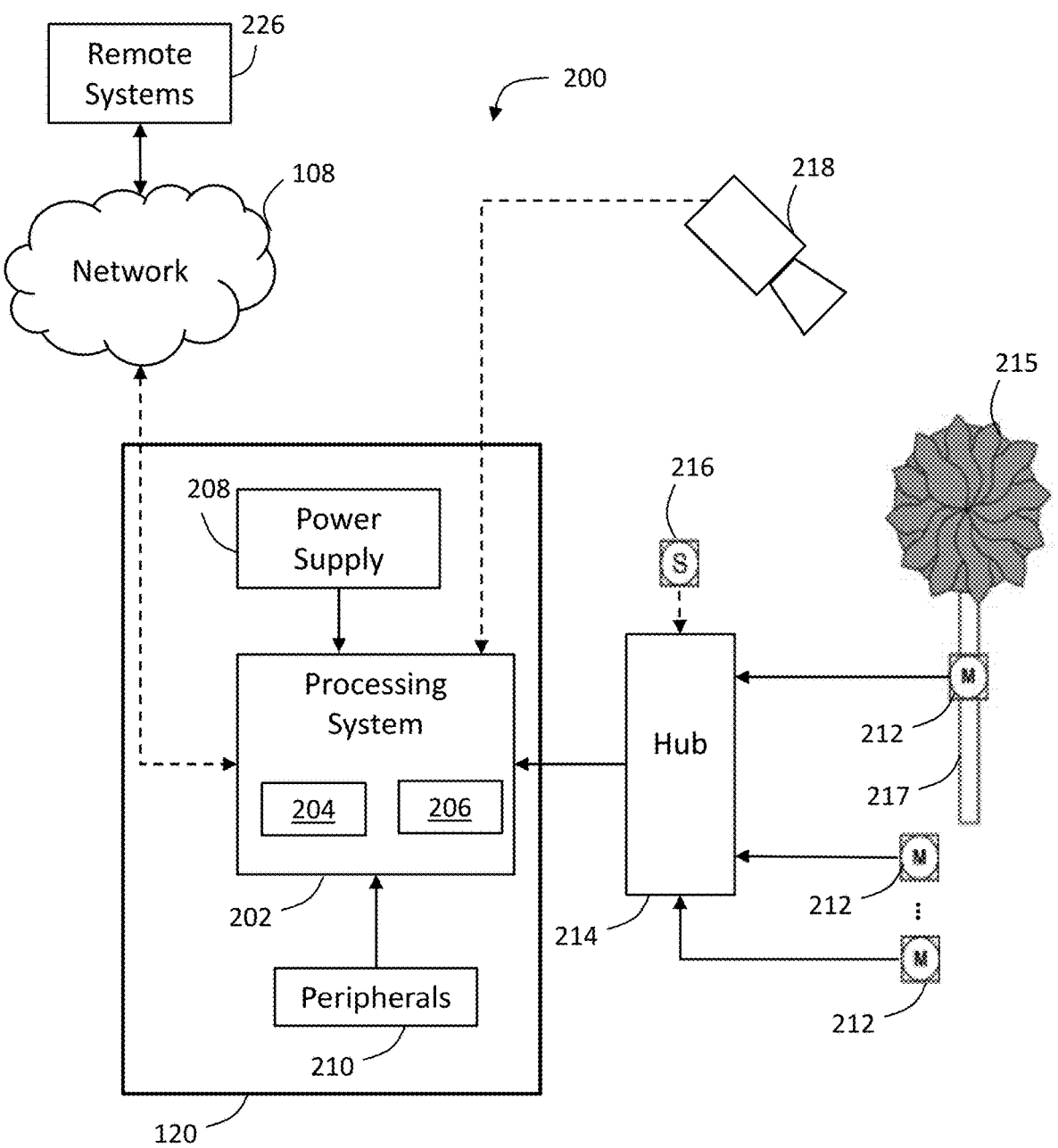
FIG. 2 depicts a data collection system in accordance with one or more embodiments.

The diagrams depicted herein are illustrative. There can be many variations to the diagrams or the operations described therein without departing from the spirit of the invention. For instance, the actions can be performed in a differing order or actions can be added, deleted or modified. All of these variations are considered a part of the specification.

DETAILED DESCRIPTION

Described herein are methods, systems, and computer program products for audio-based insect monitoring and prediction. In an aspect, audio data can be gathered and processed to predict insect activity at plants, such as a crop field. Insect activity can include feeding occurring on a plant, within a plant, and/or on a root system of a plant. Contact microphones can be used as a non-invasive and efficient tool for detecting, identifying, and monitoring insects feeding on plants. Contact microphones can be attached to a surface of plants (e.g., one microphone per observed plant) to listen for insect activity, including boring insects and/or root-feeding insects that may not otherwise be visible through camera-based observations. Examples of insects can include tobacco hornworm (*Manduca sexta* Linnaeus), Colorado potato beetle (*Leptinotarsa decemlineata* Say), European corn borer (*Ostrinia nubilalis* Hübner), and northern corn rootworm (*Diabrotica longicornis* Say), and/or other such insects. The microphones can be connected to one or more data collection devices to digitally capture sounds made by herbivorous insects feeding on the plants. Audio recordings of the sounds can be analyzed, for instance, using machine learning to determine the presence and/or absence of insects and to quantify differences found between insect feeding. Such an approach can be used to detect herbivorous insects feeding on various types of plants, such as tobacco, potato, corn, and other such plants. Audio-based monitoring of insect activity can be used for a variety of insect sizes, such as large and small-bodied Lepidopteran and Coleopteran pests. The recordings can be used to train one or more machine learning models to distinguish differences in feeding patterns, frequency, amplitude, and circadian activity of different insect species at various life stages. Signal characteristics, such as spectrographic data, can be used separately or in combination with machine learning models to identify one or more insect characteristics. In some aspects, insect activity can be determined based on at least in part by using existing databases and one or more characteristic sound algorithms.

Audio-based insect activity monitoring, as further described herein, can improve pest management strategies by enabling early detection of infestations and more targeted application of pesticides. Audio-based monitoring can provide a non-destructive and simpler approach to localized monitoring of plants for insect activity. With optical sensors, such as camera traps, photo identification, and lidar, the entomological taxonomic problem space is extremely large. Audio-based observation can result in effective observation and predictions with a lower computational burden as compared to multi-dimensional imaging devices. Further, the use of a contact microphone in contact with a plant surface, can detect surface vibrations at the plant surface. The audio data can be derived from mechanical vibrations rather than airborne sound waves. The contact microphone can be implemented as a piezo microphone to sense audio vibration in a solid object and can be substantially insensitive to air vibrations. Thus, the contact microphone can pick up on insects that use plant substrate communication (e.g., tapping) and can be used for leafhopper detection (an insect family that vectors many plant diseases).

Figure 1:
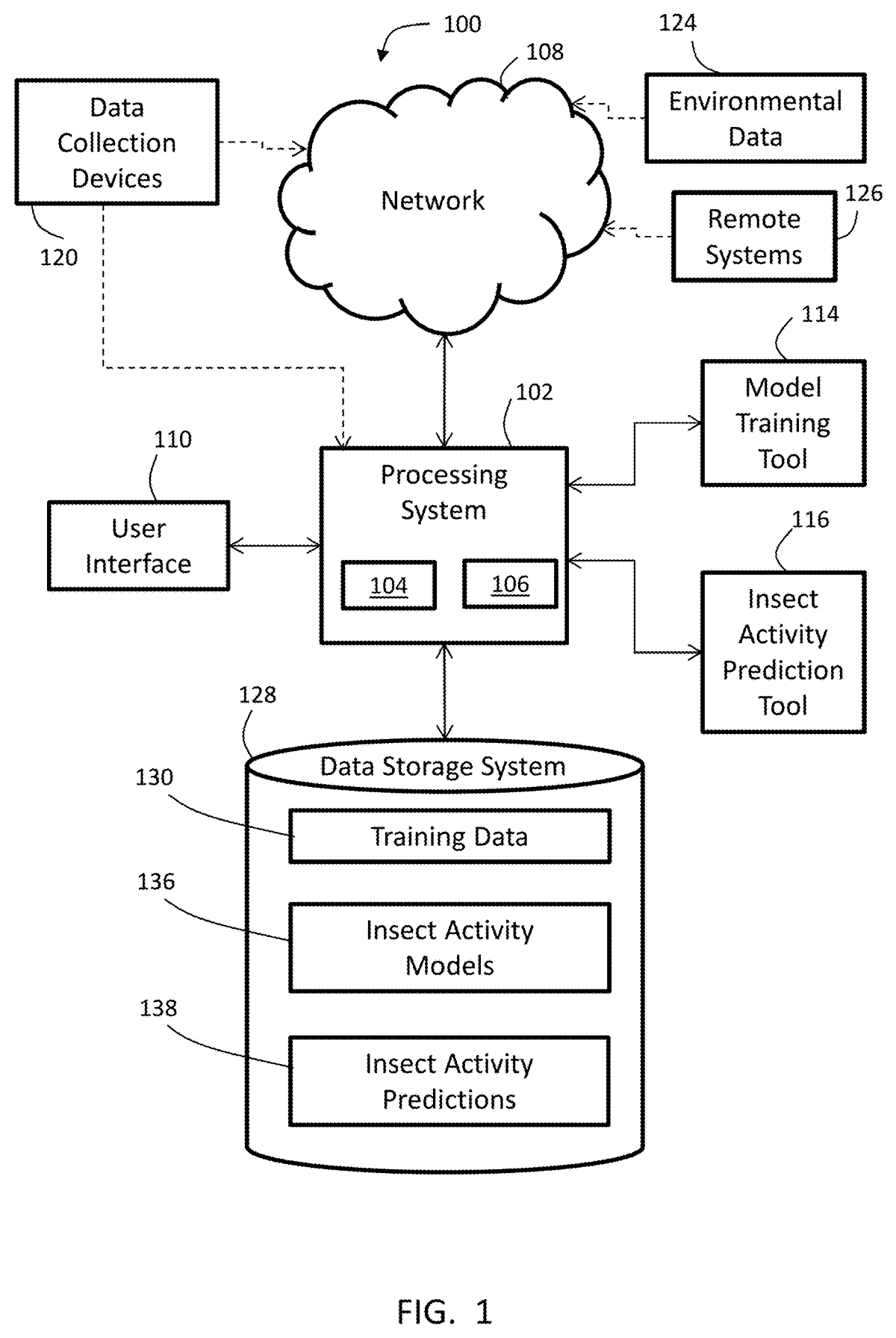

Turning now to the figures, FIG. 1 depicts an example of an insect activity prediction system 100 according to embodiments. The insect activity prediction system 100 includes a processing system 102 that may include one or more processors 104 and a memory system 106 operable to execute software instructions embodied in one or more applications, such as a model training tool 114 and/or an insect activity prediction tool 116. The processing system 102 may be a single computer system such as a workstation, a personal computer, a laptop computer, a tablet computer, a mobile device, or the like. Alternatively, the processing system 102 can be distributed between multiple computing devices such as a mainframe, a cloud-based computing system, edge computing devices, or other type of processing resources including one or more networked devices. The processing system 102 can interface with multiple systems and data sources through a network 108.

The network 108 can include any type of computer communication technology within the insect activity prediction system 100 and can extend beyond the insect activity prediction system 100 as depicted. Examples include a wide area network (WAN), a local area network (LAN), a global network (e.g., Internet), a virtual private network (VPN), and an intranet. Communication within the network 108 may be implemented using a wired network, an optical network, a wireless network and/or any kind of physical network implementation known in the art. The network 108 can be further subdivided into multiple sub-networks that may provide different levels of accessibility or prevent access to some elements of the insect activity prediction system 100. For example, some systems, devices, applications, or users may have limited access to a data storage system 128 and/or other elements of the insect activity prediction system 100. Communication within the insect activity prediction system 100 can include wired, wireless, and/or optical based forms of communication.

One or more data collection devices 120 can provide data through the network 108 or may otherwise provide data to the processing system 102 (e.g., through a direct link or memory device) for either or both of the model training tool 114 and the insect activity prediction tool 116. The data collection devices 120 can transfer or upload raw audio data, processed/compressed audio data, sensor data, image data, and/or other information associated with a location of one or more plants under observation for insect activity.

Environmental data 124, such as, wind, precipitation, temperature, and/or other such information relevant to plants under analysis may also be accessible through the network 108. In some aspects, the data collection devices 120 can capture the environmental data 124 and provide the environmental data 124 as part of the uploaded data received by the processing system 102.

A user interface 110 can be provided to interact with the processing system 102, such as one or more of a keyboard, a mouse or pointer device, a camera, speakers, a microphone, a video display, and/or a touch-sensitive display. The model training tool 114 and/or the insect activity prediction tool 116 can be accessed through the user interface 110 and/or accessed by one or more remote systems 126 through the network 108. The remote systems 126 can be various types of computing devices, such as mobile devices, tablet computers, laptop computers, personal computers, workstations, internet connected devices, and/or other such devices capable of executing applications and/or interfacing to a website. Remote systems 126 can have various permissions with respect to the insect activity prediction system 100, such as administrative privileges, researcher privileges, private user privileges, and/or public user privileges. For instance, an administrative user may be able to updates aspects of the model training tool 114, insect activity prediction tool 116, and/or data stored in the data storage system 128. Researcher privileges may allow a user access to data sets covering multiple locations. A private user may have access to a subset of data associated with a particular location. A public user may be granted access to certain public data sets managed by the insect activity prediction system 100 but be blocked from accessing private data sets.

The data storage system 128 can be used to store a number of data sets, models, and/or predictions. For example, the data storage system 128 can store one or more of training data 130, insect activity models 136, insect activity predictions 138, and/or other such content.

As one example, training data 130 can be collected from growers of multiple types of plants over a period of time. For instance, data can be collected from controlled locations with known insects introduced and in proximity to similar plants isolated from insect activity. Audio data collected under such conditions can provide ground truth measurements to develop the insect activity models 136 that can be used to make various insect activity predictions 138, such as predicting the presence of insects and at least one species of the insects. Examples of detectable insects include boring insects, root-feeding insects, exterior surface feeding insects, other such herbivore insects at various stages of development (e.g., larval to adult).

The insect activity models 136 can include a combination of machine learning of based on audio and/or other supporting data. The model training tool 114 can test and refine the insect activity models 136. The insect activity prediction tool 116 can use the insect activity models 136 to make insect activity predictions 138 depending upon the type of input data available. For instance, some insect activity models 136 can be trained using only audio data, while others may be trained using a combination of audio and video/image data. Some insect activity models 136 can be trained using a combination of audio data and the environmental data 124.

The model training tool 114 can implement several machine learning models. For instance, model training tool 114 can train groups of models within the insect activity models 136 using deep learning of sounds observed within a plurality of plants over a training collection period from the training data 130. Using training data 130 collected for a variety of plant and insect types in various geographic locations and environments can result in a robust collection of insect activity models 136. As one example, the insect activity models 136 can include a first convolutional neural network trained to identify the presence of insects and a second convolutional neural network trained to identify at least one species of the insects. After training is performed, an insect activity model 136 can be selected for use that aligns with aspects of a targeted application. For example, an insect activity model 136 can be selected from a plurality of models trained for various plant and insect types, and/or the insect activity model 136 can be selected based on a geographic location of plants under observation. Further training types can include training to detect herbivore insects that are parasitized. Other types of training can distinguish the life stage of immature insects, for instance, through training in a controlled environment using insects at known stages of development. The insect activity models 136 can perform other types of signal processing and analysis separately or in combination with machine learning models to identify one or more insect characteristics.

Although the example of FIG. 1 depicts both model training and model use by the insect activity prediction system 100, it will be understood that such as activities can be performed by separate systems or subsystems. For example, after training of the insect activity models 136 is performed, one or more of the insect activity models 136 and insect activity prediction tool 116 can be deployed to one or more other systems which may not also perform training aspects.

FIG. 2 depicts a data collection system 200 in accordance with one or more embodiments. The data collection system 200 can include at least one data collection device 120. The data collection device 120 can include processing system 202 that may include one or more processors 204 and a memory system 206 operable to execute software instructions embodied in one or more applications. The data collection device 120 and processing system 202 therein can be a compact system with an environmentally-protected enclosure to support deployment in close proximity to one or more plants 215 under observation. The data collection device 120 can also include a power supply 208 and peripherals 210. The power supply 208 can include a battery pack, solar array, and/or power converter that may be used when another external power source is available. The peripherals 210 can include user interfaces, removable memory devices, and/or interfaces for input/output devices to communicate with an operating system or application executing on the processing system 202. The processing system 202 can receive audio inputs from one or more microphones 212. At least one of the microphones 212 is configured to be attached to a surface 217 of a plant 215 under observation. Attachment can be performed using a clip or sticker, for example. Examples of the surface 217 can include any plant tissue such as, leaves, shoots, stems/stalks, and reproductive units. Audio data collected by the microphones 212 may be passed through a hub device 214 to provide the audio data in a digitized format to the processing system 202. For instance, the hub device 214 may accept audio input from multiple microphones 212 and provide a single connection to the processing system 202, for instance, through a universal serial bus link or other such interface type. In some embodiments, the audio signals from the microphones 212 may pass through one or more sound cards or other such devices to digitize analog audio before passing the audio to the processing system 202. At least one of the microphones 212 in contact with the surface 217 can be a contact microphone configured to detect mechanical vibration within the plant 215. The hub device 214 can support wired, wireless, and/or optical data transmission. In some aspects, the hub device 214 may include processing capabilities to perform signal conditioning on the output of microphones 212 and other sensors 216. For example, signal conditioning can include gain control, noise filtering, and/or other such conditioning techniques.

Additional sensors 216 may also provide input to the processing system 202. For example, sensors 216 can include a light sensor, a precipitation sensor, a wind sensor, a humidity sensor, a temperature sensor, a soil moisture sensor, and other such sensors known in the art. The sensors 216 can be directly connected to the data collection device 120 or may be indirectly connected, for instance, through the hub device 214. As a further example, a camera 218 can provide a video input (e.g., video or still images) to the processing system 202. Visual observations made through image/video data captured by the camera 218 can be in addition to or in place of other sensors 216. For instance, camera data from the camera 218 can include images or video of the plant 215 and surrounding environment. The images can detect wind through movement of the plant 215, precipitation through observing rain/sleet/snow, ambient light, and other such information. Further, the images captured by the camera 218 may also detect other events, such as animal, machine, or human interaction with the plant 215.

Data collected by the data collection device 120 can be captured locally in a memory device and/or transmitted to another location, such as to one or more remote systems 226 through network 108. The remote systems 226 can be the same or different systems than the remote systems 126 of FIG. 1. In some aspects, data collected at the data collection device 120 can be preprocessed, compressed, and/or filtered. In other aspects, the data collection device 120 can perform raw data collection and storage. Communication between components of the data collection system 200 can be performed using wired, wireless, and/or optical links.

Although one example is depicted in FIG. 2, it will be understood that components and processing can be distributed or otherwise subdivided. For example, the hub 214 can be omitted, and the microphones 212 and/or sensors 216 can be configured to wirelessly transmit signals to the data collection device 120. Further, multiple data collection devices 120 can be networked together. Machine learning and other such processing can be distributed or shifted between localized processing at the data collection device 120, the hub device 214, remote systems 226, and/or other components coupled through the network 108. In some aspects, the microphones 212 and/or sensors 216 can have local processing to perform signal conditioning and/or monitoring to reduce the processing burden at the data collection device 120 and/or remote systems 226.

FIG. 3 depicts a training process 300 in accordance with one or more embodiments. At block 305, audio data from one or more contact microphones 212 can be collected to capture insect sounds at one or more plants 215 in a training environment. The collected audio data can be provided to the model training tool 114 as part of training data 130. At block 310, the model training tool 114 can train a first model of the insect activity models 136 based at least in part on the audio data to detect a presence of insects. At block 315, the model training tool 114 can train a second model of the insect activity models 136 based at least in part on the audio data to identify a species of the insects. At block 320, the first and second models can be provided to a monitoring system to use as the insect activity models 136. In some aspects, the insect activity prediction system 100 may perform as a monitoring system executing the insect activity prediction tool 116. In other aspects, the insect activity prediction tool 116 can be deployed to execute locally within one or more of the data collection devices 120. Further, monitoring can be distributed where at least a portion of the insect activity prediction tool 116 is executed on one or more remote systems 126, 226. In addition or alternatively, models can be trained to detect insect life stages, insect behavior, insect health, and/or other types of insect activity and insect characteristics. Further, signal processing can be used in combination with or in place of machine learning models in some instances. For example, where insufficient training data is available for a desired characteristic, signal features can be used for detection until models are trained that consistently outperform other signal processing techniques. For instance, signature activity at certain frequency ranges may be observed.

Training can include data collection and processing under controlled conditions. As one example, individual insects can be placed on clean plants with multiple microphones 212 attached to the plants. Feeding and movement can be recorded for a predetermined period of time that may extend beyond a single day. Recorded sound data can be filtered and processed for training. As one example, acoustic features can be observed using spectrograms to capture unique spectral and temporal characteristics specific to each insect species and its feeding behaviors. Regions of interest can be identified in spectrograms to focus on areas of interest for further analysis. Dimensionality can be reduced using, for instance a t-distributed Stochastic Neighbor Embedding (t-SNE). Applying a t-SNE can reduce a high-dimensional feature space of extracted features into a two-dimensional space while preserving local relationships. This can aid in visualizing complex relationships between different insect sound recordings. Unsupervised clustering can be performed by grouping similar feature vectors obtained from t-SNE into clusters based on proximity in the reduced feature space. This can support identification of sound types without the need for prior labeling or classification. Fine-tuning parameters of t-SNE and unsupervised clustering can optimize clustering performance across diverse insect species and environmental conditions. Additionally, various spectrogram formation techniques and regions of interest selection criteria can enhance the discriminatory power of the extracted features.

Although depicted in a particular order, it will be understood that some steps of the process 300 can be performed in an alternate order, can be combined, further subdivided, and/or expanded upon. Further, training can be performed incrementally as additional data sets are collected to tune existing models or train new models.

FIG. 4 depicts an audio-based insect activity monitoring process 400 in accordance with one or more embodiments. The process 400 can be performed by the insect activity prediction tool 116, for example.

At block 405, the insect activity prediction system 100 can receive audio data associated with at least one microphone 212 in contact with a surface 217 of a plant 215. The audio data can be processed by the insect activity prediction tool 116.

At block 410, the insect activity prediction system 100 can input the audio data into insect activity model 136 to generate an insect activity prediction 138. For example, the insect activity prediction tool 116 can analyze data collection parameters, such as a plant type and/or geographic location of the plants, to determine which of the insect activity models 136 should be used. The insect activity models 136 can be trained based at least in part using deep learning (e.g., a multi-layer neural network or convolutional neural network) of sounds observed within a plurality of plants over a training collection period. As a further example, training of the insect activity models 136 can be performed at least in part using an algorithm and database accounting for sounds observed within a plurality of plants over a training collection period.

At block 415, the insect activity prediction system 100 can use the insect activity model 136 to generate an insect activity prediction 138 of a presence of insects and at least one species of the insects based at least in part on the audio data. Where the presence of insects is below a threshold level, the species prediction may not be performed or may not be output due to a low confidence of insects being present.

At block 420, the insect activity prediction system 100 can output the insect activity prediction 138 to a user interface 110. The output can be a text, an audio output, and/or other visual output. As one example, the output can be a map associated with a field of crops. For instance, a map of insect activity predictions 138 can appear as a heat map that aligns a geographic location of data collection.

In some aspects, the audio data can be captured by a data collection device 120 including a processing system 202 through one or more audio interfaces configured to capture audio input from at least one microphone 212. In some aspects, two or more of the microphones 212 can capture a plurality of audio streams associated with a plant 215. In other aspects, two or more of the microphones 212 can capture a plurality of audio streams associated with at least two different plants 215.

In some aspects, environmental data 124 associated with a location of the plant 215 at a time of collecting the audio data can be received. The environmental data 124 can be captured by a data collection device 120 that captures the audio data and/or can be received from a data source that differs from a data collection device 120 that captures the audio data (e.g., a weather observation website). A validity status of the audio data can be determined based on the environmental data 124. The audio data can be validated based on determining that the validity status confirms one or more environmental conditions. The one or more environmental conditions can include one or more of a wind level below a wind threshold and a precipitation activity below a precipitation threshold. For example, where a wind speed is above the wind threshold, the audio data may be discarded as potentially too noisy to distinguish insect activity. Further, precipitation activity above the precipitation threshold may interfere with audio data collection. Alternatively, the observation of wind and/or precipitation may result in selecting another version of the insect activity model trained under similar conditions (e.g., a windy day model).

Figure 5:
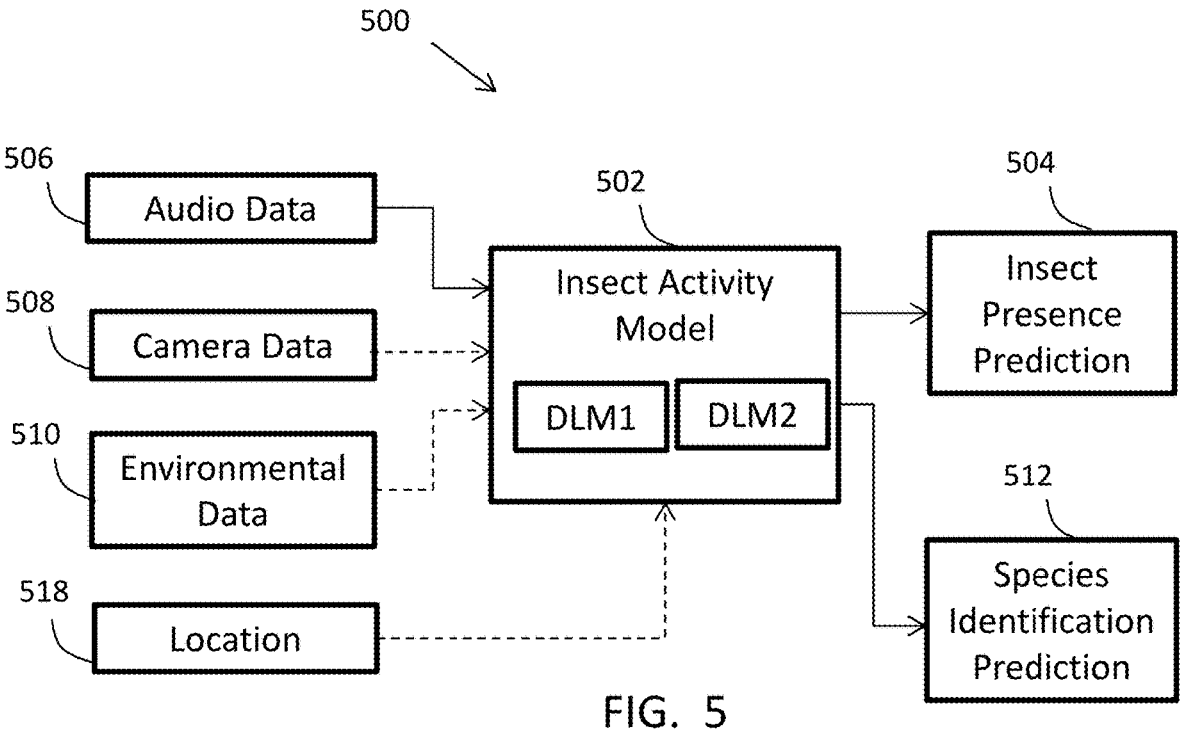
FIG. 5 depicts a block diagram of using an insect activity model for insect activity prediction in accordance with one or more embodiments.

FIG. 5 depicts a block diagram 500 of using an insect activity model 502 in accordance with one or more embodiments. In the example of FIG. 5, the insect activity model 502 (e.g., one of the insect activity models 136) can output an insect presence prediction 504 and a species identification prediction 512 based on audio data 506 (e.g., from one or more data collection devices 120). The insect presence prediction 504 and species identification prediction 512 are examples of the insect activity predictions 138. In some aspects, a first deep learning model (DLM1) may be trained to output the insect presence prediction 504, and a second deep learning model (DLM2) may be trained to output the species identification prediction 512. Each of the deep learning models can also be trained using additional data sources, such as camera data 508 from camera 218, environmental data 510 (e.g., environmental data 124) associated with a location 518 of the plants 215 under observation, and other data related to the location 518, for example. In some embodiments, execution of the second deep learning model may be conditioned upon an output of the first deep learning model exceeding a threshold, such as a minimum presence limit. The first and second deep learning models can be implemented as convolutional neural networks (CNNs), for example. Although only two deep learning models are depicted in the example of FIG. 5, additional models can also be implemented. Other types of machine learning can include, for example, auto-encoders, random forest, various neural network architectures, and/or combinations thereof. Further aspects can include identification of insect life stages as well as determining if the identified insects contain a parasitoid, for example. In some aspects, the insect activity model 502 can include one or more machine learning models trained to distinguish between audio characteristics of insect chewing, insect sucking, insect tapping, and insect movement on or within plant leaves, flowers, fruit, stems, branches, stalks, petioles, buds, and/or roots at one or more insect life stages. Further, the insect presence prediction 504 data can be used to determine a quantity or density of insects on a plant over a period of time. Data from the insect presence prediction 504 and species identification prediction 512 can be used to develop sequence-based predictions, such as monitoring for activity gaps, synchronized activity, movement/tapping vs. feeding times, changes in lifecycle, and other such higher-level observations. For instance, time-based changes can include louder activities as insects grow and/or multiply in number. Event extraction can be used to reduce some processing burden such that predictors need not run during times of low to no activity.

Figure 6:
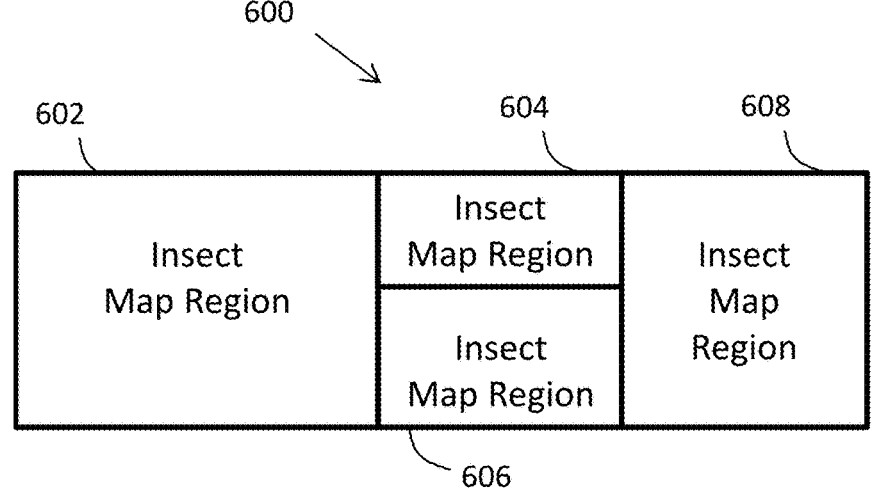
FIG. 6 depicts a block diagram of insect map regions in accordance with one or more embodiments.

Insect activity predictions 138 for a plant 215 can be combined with one or more insect activity predictions 138 for a plurality of plants 215 to produce an insect map for one or more geographic regions. FIG. 6 depicts a block diagram 600 of insect map regions. In the example of FIG. 6, the insect activity predictions 138 of FIG. 1 and associated location information of data collection can be translated into a plurality of insect map regions 602, 604, 606, 608, etc. The insect map regions 602-608 can be output on the user interface 110 of FIG. 1 to visually illustrate insect activity over multiple locations, such as crop fields. The output can be a heatmap or overlay data values on a map. Further, data can be collected over multiple growing seasons to depict historical data and trends, as well as observe pesticide application effects on insect activity over time for various locations.

Technical effects and benefits can include processing audio data collected from one or more microphones in contact with one or more plant surfaces to predict insect activity at one or more plants. The processing described herein results in a practical application and improves the field of plant/crop management. The predictions can be used to adjust pesticide application systems and schedules, soil amendments, and other such activities. Higher precision data and predictions can result in improved plant/crop outcomes, reduced use of resources, and a reduced risk of environmental impact through preventing overapplication of corrective actions. Results can be used, for example, in automating phenotyping for insect resistance in various types of plants. Use of the insect activity prediction system can allow eavesdropping on insect activity occurring on, within, or in close proximity to plants and root systems without damaging the plants. Such uses can support observation in non-destructive monitoring without sacrificing plants that may otherwise occur through physically exposing roots or performing plant dissection to observe insect activity. Further, the long-term observation can be supported on the same plants using the insect activity prediction system to observe seasonal activity and various life stages of insects that contact monitored plants.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), phase change memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Python, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application. Numerical values, ranges, index selection, calibration, validation, and other parameters and/or processes described herein are provided for purposes of explanation, and the invention is not limited to using these examples.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The terms "first," "second," and the like, herein do not denote any order, quantity, or importance, but rather are used to denote one element from another. The use of the terms "a" and "an" and "the" and similar referents (especially in the context of the following claims) are to be construed to cover both the singular and the plural, unless otherwise indicated herein or clearly contradicted by context. The terms first, second etc. as used herein are not meant to denote any particular ordering, but simply for convenience to denote a plurality of, for example, layers. The terms "comprising", "having", "including", and "containing" are to be construed as open-ended terms (i.e., meaning "including, but not limited to") unless otherwise noted. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +10% or 5% of the stated value. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Any combination of the above-described elements in all possible variations thereof is encompassed by the invention unless otherwise indicated herein or otherwise clearly contradicted by context.

What is claimed is:

1. A method, comprising:

receiving, by an insect activity prediction system, audio data associated with at least one microphone in contact with a surface of a plant;

receiving environmental data associated with a location of the plant at a time of collecting the audio data;

determining a validity status of the audio data based on the environmental data;

validating the audio data based on determining that the validity status confirms one or more environmental conditions, wherein the one or more environmental conditions comprise one or more of a wind level below a wind threshold and a precipitation activity below a precipitation threshold;

inputting, by the insect activity prediction system, the audio data into an insect activity model to generate an insect activity prediction;

generating, by the insect activity prediction system using the insect activity model, an insect activity prediction of a presence of insects and at least one species of the insects based at least in part on the audio data and the validity status of the audio data; and outputting the insect activity prediction to a user interface.

2. The method of claim 1, wherein the audio data is captured by a data collection device comprising a processing system through one or more audio interfaces configured to capture audio input from the at least one microphone.

3. The method of claim 2, wherein two or more of the at least one microphone capture a plurality of audio streams associated with the plant.

4. The method of claim 2, wherein two or more of the at least one microphone capture a plurality of audio streams associated with at least two different plants.

5. The method of claim 1, wherein the environmental data is captured by a data collection device that captures the audio data and/or received from a data source that differs from the data collection device that captures the audio data.

6. The method of claim 1, wherein the insect activity model comprises one or more machine learning models trained to distinguish between audio characteristics of insect chewing, insect sucking, insect tapping, and insect movement on or within plant leaves, flowers, fruit, stems, branches, stalks, petioles, buds, and/or roots at one or more insect life stages.

7. The method of claim 1, wherein the insect activity model comprises a first convolutional neural network trained to identify the presence of the insects and a second convolutional neural network trained to identify at least one species of the insects.

8. The method of claim 1, wherein the insect activity model is selected from a plurality of models trained for various plant and insect types, and the insect activity model is selected based on a geographic location of the plant.

9. The method of claim 1, further comprising:

combining the insect activity prediction for the plant with one or more insect activity predictions for a plurality of plants to produce an insect map for one or more geographic regions.

10. A system comprising:

a memory system having a plurality of computer readable instructions; and one or more processors configured to execute the computer readable instructions to perform a plurality of operations comprising:

receiving audio data associated with at least one microphone in contact with a surface of a plant;

receiving environmental data associated with a location of the plant at a time of collecting the audio data;

determining a validity status of the audio data based on the environmental data;

validating the audio data based on determining that the validity status confirms one or more environmental conditions, wherein the one or more environmental conditions comprise one or more of a wind level below a wind threshold and a precipitation activity below a precipitation threshold;

inputting the audio data into an insect activity model to generate an insect activity prediction;

generating, by the insect activity model, an insect activity prediction of a presence of insects and at least one species of the insects based at least in part on the audio data and the validity status of the audio data; and outputting the insect activity prediction to a user interface.

11. The system of claim 10, wherein the audio data is captured by a data collection device through one or more audio interfaces configured to capture audio input from the at least one microphone.

12. The system of claim 10, wherein the insect activity model comprises a first convolutional neural network trained to identify the presence of the insects and a second convolutional neural network trained to identify at least one species of the insects.

13. The system of claim 10, wherein the insect activity model is selected from a plurality of models trained for various plant and insect types, and the insect activity model is selected based on a geographic location of the plant.

14. The system of claim 12, wherein the computer readable instructions are executable by the one or more processors to perform the operations further comprising:

combining the insect activity prediction for the plant with one or more insect activity predictions for a plurality of plants to produce an insect map for one or more geographic regions.

15. A computer program product comprising a non-transitory computer readable storage medium embodied with computer program instructions that when executed by one or more processors cause the one or more processors to perform a plurality of operations comprising:

receiving audio data associated with at least one microphone in contact with a surface of a plant;

receiving environmental data associated with a location of the plant at a time of collecting the audio data;

determining a validity status of the audio data based on the environmental data;

validating the audio data based on determining that the validity status confirms one or more environmental conditions, wherein the one or more environmental conditions comprise one or more of a wind level below a wind threshold and a precipitation activity below a precipitation threshold;

inputting the audio data into an insect activity model to generate an insect activity prediction;

generating, by the insect activity model, an insect activity prediction of a presence of insects and at least one species of the insects based at least in part on the audio data and the validity status of the audio data; and outputting the insect activity prediction to a user interface.

16. The computer program product of claim 15, wherein the insect activity model comprises a first convolutional neural network trained to identify the presence of the insects and a second convolutional neural network trained to identify at least one species of the insects.

17. The computer program product of claim 15, wherein the environmental data is captured by a data collection device that captures the audio data and/or received from a data source that differs from the data collection device that captures the audio data.

18. The computer program product of claim 15, wherein the insect activity model comprises one or more machine learning models trained to distinguish between audio characteristics of insect chewing, insect sucking, insect tapping, and insect movement on or within plant leaves, flowers, fruit, stems, branches, stalks, petioles, buds, and/or roots at one or more insect life stages.

19. The computer program product of claim 15, wherein the insect activity model is selected from a plurality of models trained for various plant and insect types, and the insect activity model is selected based on a geographic location of the plant.

20. The computer program product of claim 15, wherein the computer program instructions are executable by the one or more processors to perform the operations further comprising:

combining the insect activity prediction for the plant with one or more insect activity predictions for a plurality of plants to produce an insect map for one or more geographic regions.

* * * * *